UNITED STATES PATENT OFFICE.

T. CHALKLEY TAYLOR, OF CAMDEN, NEW JERSEY.

IMPROVEMENT IN SOAP COMPOUNDS.

Specification forming part of Letters Patent No. 11,097, dated June 13, 1854.

*To all whom it may concern:*

Be it known that I, T. CHALKLEY TAYLOR, of Camden, in the county of Camden and State of New Jersey, have invented or discovered certain new and useful Improvements in the Manufacture of Soap; and I do hereby declare the following to be a full, clear, and exact description of the same.

The nature of my invention consists in dissolving the bran of cereal grains in caustic alkali and using the product either by itself or in connection with other soaps or as an ingredient in the manufacture of soap.

To enable others skilled in the art to make and use my invention or discovery, I will proceed to describe more particularly the manner in which I accomplish the same.

I take the bran of any of the cereal grains and immerse it in a caustic alkali in the proportions of about one pound of bran to two gallons aqueous solution of alkali of the specific gravity of 1.08, more or less. This mixture is occasionally stirred during a space of two or three hours, which, however, will be varied in proportion to the strength of the alkali used; but in practice it will be found that alkali of the specific gravity above mentioned will in the course of three hours take up the whole of the bran, with the exception, perhaps, of a small residuum of woody matter, which may be separated from the liquid by passing it through a sieve. The mixture at this stage is ready to be used as a soap, or may with economy be used as a leading ingredient in the manufacture of hard soaps, or may be mixed by boiling with soap already made.

For the purpose of facilitating the more ready decomposition of the bran it may be found expedient to boil the bran in water for a greater or less period of time, and I contemplate, in the more refined qualities of soap, so to treat it.

Having thus fully described the nature of my invention or discovery, what I claim therein as new, and desire to secure by Letters Patent, is—

The dissolving of the bran of cereal grains in caustic alkali and using the product as a substitute for or as an ingredient in the manufacture of soap, substantially as described.

T. CHALKLEY TAYLOR.

Witnesses:
H. DONN,
JOHN Y. DONN.